United States Patent Office 3,711,451
Patented Jan. 16, 1973

3,711,451
HYDROXYL CONTAINING LIQUID MERCAPTAN-TERMINATED ACRYLATE POLYMERS
Alan A. Csontos, Norton, Ohio, assignor to The B. F. Goodrich Company, New York, N.Y.
No Drawing. Filed May 12, 1971, Ser. No. 142,808
Int. Cl. C08d 3/02
U.S. Cl. 260—79
10 Claims

ABSTRACT OF THE DISCLOSURE

Liquid mercaptan-terminated acrylate polymers containing pendant hydroxyl groups are obtained by preparing an intermediate polymer of an alkyl acrylate (a) with a with a vinylidene (>C=CH$_2$) monomer containing a hydroxyl group in the presence of a dixanthogen disulfide, and then hydrolyzing or pyrolyzing the intermediate polymer to form mercaptan groups, (b) with vinyl acetate in the presence of a dixanthogen disulfide, and then hydrolyzing the acetate groups to form hydroxyl groups either prior to or after forming the mercaptan groups, and (c) with a vinylidene monomer containing an epoxide

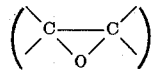

group in the presence of a dixanthogen disulfide, and then reacting the epoxide group with an alcohol to introduce hydroxyl groups either prior to or after forming the mercaptan groups. The polymers cure at application temperatures and have low temperature extensibility, may be formed into caulks, sealants, potting compounds and adhesives.

BACKGROUND OF THE INVENTION

Acrylate elastomers possess good weatherability and oil resistance. These properties are advantageous in base polymers used in sealants, caulks, and like formulations. However, for ease of application, the sealant or caulk must be pourable at application temperatures, or extrudable as from a tube, or moldable under slight pressure. This can be attained either by dissolving a solid acrylate elastomer in a suitable solvent or by using a low molecular weight (liquid) acrylate polymer that is capable of being cured to a solid elastomer after being applied. Since organic solvents may be hazardous or toxic, a low molecular weight (liquid) acrylate polymer is a more desirable form.

A sealant or a caulk should have elastomeric properties over a wide range of temperatures, especially low temperatures. General Services Administration Specification TT-S-00227E Requirement 3.5.8 Durability requires that a sealant have extensibility at —15° F. (—26° C.). To meet this, alkyl acrylates wherein the alkyl group contains three or more carbon atoms are used to provide polymers having a Tg (glass transition temperature) of below —26° C. However, when these elastomers are vulcanized, they often are slow to cure and have an objectionable tacky surface.

SUMMARY OF THE INVENTION

This invention provides acrylate polymer compositions, pourable at application temperatures, having a Tg value below —15° F. (—26° C.), having terminal mercaptan groups and pendant hydroxyl groups, that are readily cured at application temperatures to a substantially tack-free surface.

DETAILED DESCRIPTION

Liquid mercaptan-terminated, pendant hydroxyl acrylate polymers containing about 0.1 to 10 weight percent hydroxyl and about 0.5 to 10 weight percent mercaptan groups can be prepared by several processes.

The pendant hydroxyl groups can be introduced into the polymer by polymerizing together alkyl acrylate monomers with vinylidene (>C=CH$_2$) monomers containing hydroxyl groups in the presence of a dixanthogen disulfide. Typical hydroxyl-containing vinylidene monomers are methallyl alcohol, hydroxy butyl vinyl ether, and ortho-, meta-, and para- vinyl benzyl alcohol. To obtain the desired polymeric Tg and hydroxyl content, amounts 0.5 part to 30 parts by weight of methallyl alcohol, about 0.5 part to 60 parts by weight of hydroxybutyl vinyl ether, and about 1 part to 50 parts by weight of o-, m- and p-vinyl benzyl alcohol based on 100 parts of total monomer charged. The mercaptan groups are formed by hydrolyzing or pyrolyzing the xanthate groups.

The defined polymer can also be obtained by first preparing an intermediate polymer by polymerizing together alkyl acrylate monomers with vinyl acetate in the presence of a dixanthogen disulfide as the polymerization modifier. Amounts of vinyl acetate used to obtain the desired polymer are from about 0.5 part to 37 parts by weight based upon 100 parts of total monomer charged. The hydroxyl groups are then formed by hydrolyzing the acetate groups with potassium hydroxide in ethanol. This may be done prior to or after the hydrolysis or pyrolysis of the xanthate groups to form the mercaptan groups.

The defined polymers are readily obtained by first preparing an intermediate polymer by polymerizing together alkyl acrylate monomers with vinylidene monomers containing epoxide

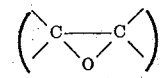

groups in the presence of a dixanthogen disulfide as the polymerization modifier. The epoxide groups are then reacted with an alcohol in the presence of a mineral acid catalyst to introduce the pendant hydroxyl groups. This may be done prior to or after the hydrolysis or pyrolysis of the xanthate groups to form the mercaptan groups. Because the epoxide-containing vinylidene monomers copolymerize readily with the alkyl acrylate monomers, and the reaction between the epoxide group and alcohol is conveniently accomplished in the manner of this invention, this process is a preferred process.

The alkyl acrylate monomers used are of the general structure

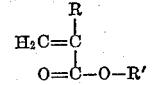

wherein R is —H, —CH$_3$, or —C$_2$H$_5$, and R' is an alkyl group containing 1 to 18 carbon atoms, or an ether group where the total number of carbon atoms does not exceed 5. The acrylates may be used singly or in combination to obtain polymers having in their cured state a Tg value below —26° C. Typical acrylates are ethyl acrylate, n-butyl acrylate, isobutyl acrylate, n-hexyl acrylate, 2-methylhexyl acrylate, methyl methacrylate, n-butyl methacrylate, n-octyl methacrylate, n-octadecyl methacrylate, ethyl ethacrylate, methoxy ethyl acrylate, ethoxy propyl acrylate, and the like. Useful compositions include at least 13 parts by weight of an alkyl acrylate where the R group is —H, and the R' group is an alkyl croup containing 3 to 8 carbon atoms with ethyl acrylate, based on 100 parts by weight of total alkyl acrylate. One useful composition contains about 20 and 40 parts by weight of ethyl acrylate and about 60 to 80 parts by weight of normal butyl acrylate based on 100 parts by weight of alkyl acrylates.

In place of part of the alkyl acrylates, other vinylidene monomers may be used as long as the polymeric Tg is not higher than −26° C. Typical vinylidene monomers which may be used are up to about 10 parts by weight of acrylonitrile, styrene, and α-methyl styrene; about 20 to 30 parts of vinyl ethers, such as vinyl methyl ether, vinyl ethyl ether, and vinyl n-butyl ether and vinyl ketones, such as vinyl methyl ketone, vinyl ethyl ketone, and vinyl isopropenyl ketone; and the like.

The epoxide-containing vinylidene monomers are used in the range of from about 2 to 20 parts by weight, based upon 100 parts by weight of the alkyl acrylates, to obtain the desired hydroxyl content in the polymer. Typical epoxide-containing vinylidene monomers are the vinylidene glycidyl esters such as glycidyl acrylate, glycidyl methacrylate, glycidyl crotonate, and the like, and the vinylidene glycidyl ethers such as allyl glycidyl ether, methallyl glycidyl ether, isopropenyl glycidy ether, and the like. The preferred epoxide-containing monomer is glycidyl acrylate as it copolymerizes fast and efficiently with the alkyl acrylate monomers. The preferred range of glycidyl acrylate used is about 3 to 10 parts by weight based on 100 parts by weight of alkyl acrylates.

The mercaptan groups are introduced into the polymer by the use of dixanthogen disulfides as the initiator and/or modifier in the polymerization of the monomers. This results in terminal xanthate groups which when reacted in a base catalyzed hydrolysis using an agent such as KOH, or under conditions of pyrolysis, form terminal mercaptan groups. The dixanthogen disulfides employed correspond to the general formula

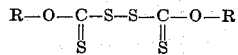

where R may be an alkyl group of 1 to 8 carbon atoms, an aryl group such as phenyl, an aralkyl group such as benzyl, and an alicyclic group such as cyclohexyl. Typical dixanthogen disulfides are diisopropyl xanthogen disulfide, disecondary butyl xanthogen disulfide, di(β-naphthyl) xanthogen disulfide, and dicyclohexyl xanthogen disulfide. Preferred dixanthogen disulfides are the alkyl dixanthogen disulfides where the alkyl group contains 3 to 6 carbon atoms. The dixanthogen disulfides are used in the range from about 2 parts to 20 parts by weight based on 100 parts of the alkyl acrylates. A more preferred range is from about 4 to 12 parts by weight.

Employing amounts of alkyl acrylate, vinylidene monomer containing epoxide groups, and dixanthogen disulfide as stated above, and polymerizing the monomers together in the presence of a dixanthogen disulfide to above 60% conversion of monomers to polymer, yields a xanthate-terminated liquid acrylate polymer containing from about 1% to 12% by weight of epoxide groups based upon the total weight of the polymer.

The xanthate-terminated polymers are prepared by free-radical polymerizations. Conventional bulk, solution, emulsion, or suspension polymerization techniques may be used employing those ingredients and polymerization conditions known to the art. Either the dixanthogen disulfide used alone or used with free-radical catalysts initiates polymerization. Typical free-radical catalysts that can be used are organic peroxides and hydroperoxides, persulfates, azo compounds, and the use of redox systems. One preferred method is to use the dixanthogen disulfide alone without the use of further free-radical catalysts, and to use ultra-violet (UV) light to dis-associate the dixanthogen disulfide into free-radicals which initiate polymerization. In this manner the dixanthogen disulfides function both as initiators and modifiers. This method is best employed in bulk or solution polymerization.

The UV polymerization of the xanthate-terminated liquid acrylate polymer is easily performed. The alkyl acrylate monomer(s), the epoxide-containing vinylidene monomer and the dixanthogen disulfide are charged to a reactor vessel along with a solvent if used. No specific order of charging is required, but it is preferable to pre- dissolve the dixanthogen disulfide in the alkyl acrylate monomer(s) or the solvent if used. The reactor vessel is then purged with nitrogen and sealed. Polymerization temperatures used range from about 20° C. to about 100° C. A preferred temperature range is from about 40° C. to about 60° C.

The UV light must be allowed to penetrate to the polymerization solution. This can be accomplished by placing the UV source within a glass tube in the reactor or by having the UV source external to the reactor vessel with the UV light passing through a glass wall or window to the solution. Any lamp generating near UV light, especially in the range of 3000 A. to 4000 A. may be used. Lamp types and their emission spectra and glass types and their transmission spectra are known to those skilled in the art.

Polymerization is initiated by turning on the UV light source and is stopped by turning off the source. Percent conversion of monomers to polymer is easily followed by taking percent total solids samples. Over 60% conversion of monomers to polymer is desirable.

The xanthate-terminated liquid acrylate polymer is recovered from solution by heating the polymerization solution under vacuum to distill off the remaining monomer(s) and solvent if used. Drying temperatures used range from about 70° C. to 130° C., with 90° C. being a convenient temperature.

Pendant hydroxyl groups are readily obtained by reacting the pendant epoxide group of the xanthate- or mercaptan-terminated polymer with an alcohol in the presence of a catalyst such as a mineral acid. A solvent may be used. Typical solvents are benzene, toluene, and hexane. The mineral acid may be any of the strong inorganic acids. Concentrated (38%) hydrochloric acid was found to be convenient. The amount of acid used is catalytic ranging from about 0.1% to about 2% by weight based on the weight of the polymer.

The alcohol may be any of the monohydroxy alcohols of the general formula R—OH where R is an alkyl group, an ether, a thioether, or a ketone where the total number of carbon atoms does not exceed 5. Polyhydric alcohols of the general formula

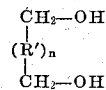

may also be employed where the $n \geq 0$ and no larger than 10, and the R group may be a radical of the formula $C_xH_{2x}$ where $x=1$ to 10, or an ether, thioether, or a ketone wherein the total number of carbon atoms does not exceed 10. The preferred alcohols are the polyhydric alcohols of the general formula

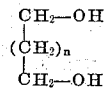

where $n=0$ to 10. These alcohols are commonly referred to as diols. Typical diols are ethylene glycol, propylene glycol, 1,4-butanediol and 1,8-octanediol.

The amount of alcohol used is based on the amount of epoxide in the polymer. This may be measured by determining the epoxide equivalents in the polymer, the grams of polymer containing one epoxy group. A more convenient method is to base the amount of alcohol used on the amount of epoxide-containing vinylidene monomer that was used in the polymerization. Levels of alcohol used range from about 0.1 mole of hydroxyl per 1 mole of epoxide to about 5 moles of hydroxyl per mole of epoxide. A preferred level is to use about one mole excess of hydroxyl to every mole of epoxide. Amounts of hydroxyl used in excess of five moles per mole of epoxide to react with the epoxide group are not necessary.

The mineral acid and alcohol are charged to the liquid acrylate polymer and the solvent in the reactor vessel. The vessel is then sealed. The reaction takes place under agitation in the temperature range of about 0° C. to about 150° C. 90° C. is a convenient temperature to use.

The pendant hydroxyl liquid acrylate polymer is recovered by putting the solution under vacuum and raising the temperature to 150° C. if needed to distill off the unreacted alcohol and solvent if used. If the alcohol boils between 150° C. and 220° C. under vacuum, and the xanthate-terminated form of the polymer was used, the alcohol can be distilled off during the pyrolysis procedure used to form the mercaptan groups. The polymer may also be recovered by using a methanol/water coagulation followed by drying at 90° C. under vacuum.

These polymers can also be obtained by first preparing vinylidene monomers containing hydroxyl groups by reacting the epoxide-containing vinylidene monomers described above with a diol following the procedure as given for the reaction of the epoxide-containing liquid polymers, and then polymerizing together the prepared monomer with alkyl acrylates in the presence of a dixanthogen disulfide. For example, the reaction product of glycidyl acrylate with 1,4-butanediol is 1-hydroxyl butoxy-2-hydroxylpropyl acrylate. This hydroxyl-containing vinylidene monomer can be polymerized together with the above stated alkyl acrylates to yield the desired polymers.

Employing the alcohols and the procedure as stated above, and using the pendant epoxide liquid acrylate polymers yields pendant hydroxyl liquid acrylate polymers containing about 32 percent to about 96 percent by weight of alkyl acrylates and about 3 percent to about 60 percent by weight of the structure

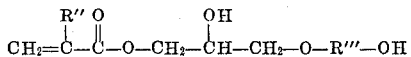

thereby having hydroxyl contents ranging from about 0.1% to 10% by weight all weights based on the total weight of polymer. More preferred, the polymer contains from about 1% to about 53% by weight of ethyl acrylate, about 13% to about 95% by weight of an alkyl acrylate of the formula $CH_2=CH-COOR$ wherein R is an alkyl group containing 3 to 10 carbon atoms about 1% to about 4% by weight of mercaptan groups and about 3% to about 30% by weight of the structure

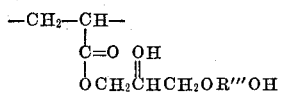

wherein $R'''$ is a radical of the formula $C_xH_{2x}$ where $x$ is 2 to 6. The preferred level of hydroxyl content is from about 0.5% to 5% by weight. It is possible following the procedure of this invention for epoxide groups to remain unreacted and pendant to the polymer.

Whether the hydroxyl-containing vinylidene monomers prepared by reacting glycidyl acrylate or glycidyl methacrylate with a diol are used as co-monomers with alkyl acrylates in the polymerization of the liquid polymers, or the epoxide groups of liquid polymers prepared by using glycidyl acrylate or glycidyl methacrylate as co-monomers in the polymerization are reacted with a diol after polymerization, the structure obtained is

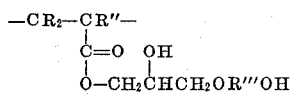

where $R''$ is —H or —$CH_3$ and $R'''$ is a radical of the formula $C_xH_{2x}$ where $x$ is 2 to 10, an ether, a thioether, or a ketone wherein the total number of carbon atoms does not exceed 10.

Other groups in addition to hydroxyl groups may be added pendant to the acrylate polymer by reaction with the epoxy group following the above procedure. Such groups include olefinic groups formed by reacting the epoxide group with hyroxy butyl vinyl ether, methallyl alcohol, and the like; carboxyl groups by using glycollic acid, malic acid, and the like; mercaptan groups by using thioglycerol and the like; and halogen groups by using glyceryl mono- and dichlorohydrin and the like.

The xanthate-terminated liquid acrylate polymers can be treated to form mercaptan groups by the hydrolysis of the xanthate groups under the action of a base such as KOH or by the pyrolysis of the xanthate groups. The hydrolysis method requires a solvent media for both the polymer and the base. This means more ingredients and another recovery step. The preferred method therefore is the bulk pyrolysis method. In this method, the xanthate-terminated liquid acrylate polymer is charged into a reactor vessel and heated to above 130° C. under vacuum. A useful temperature range is from about 130° C. to 260° C., whereas a temperature range of about 160° C. to 220° C. is more preferred. The pyrolysis may be performed in a batch or a continuous process. The time of pyrolysis varies inversely with temperature, varying from about 10 hours at 150° C. to about 20 seconds at 250° C. A useful batch pyrolysis condition is 20 minutes at 200° C. The breakdown of the xanthate groups is performed under a vacuum to rid the reactor vessel of gaseous carbonyl sulfide and the alkene derivative of the xanthate R group which are given off as by-products.

The mercaptan-terminated liquid acrylate polymers are recovered as bulk products. The mercaptan level on these compositions ranges from about 0.5% by weight to about 8% by weight based on the weight of the polymer. The preferred level is from about 1% to 4% by weight.

The liquid mercaptan-terminated acrylate polymers containing pendant hydroxyl groups are characterized by having a bulk viscosity as measured at 27° C. using a Brookfield model LVT viscometer with spindle #7 at 20 r.p.m. in the range of from about 400 cps. to 2,000,000 cps. A convenient range for many applications is from about 5,000 cps. to about 150,000 cps.

The mercaptan-terminated liquid acrylate polymers containing pendant hydroxyl groups are stable at application temperatures. The polymers may be mixed with compounding ingredients on ink mills, bulk mixing equipment such as Henschel mixers, and the like. Compound ingredients useful in liquid polymers known to those skilled in the art may be used. Typical ingredients are fillers such as clays, $TiO_2$, carbon black, silicas, and the like; lubricants and plasticizers; stabilizers and antioxidants; and pigments.

Cure agents for the mercaptan-terminated liquid polymers are selected from oxidizing agents such as $PbO_2$, $PbO_2$ in the presence of an organic acid such as acetic acid, tertiary butyl perbenzoate, and organic and inorganic peroxides; di- and trifunctional acrylates such as trimethylol propane triacrylate employing an amine catalyst; diisocyanates such as tolylene diisocyanate, 4,4'-diisocyanato diphenyl methane, and the like; and epoxy resins and epoxy Novalac resins both employing an amine catalyst. Epoxy resins such as diglycidol ethers of Bisphenol A employing an amine catalyst are the preferred curatives. Typical amine catalysts are 2,4,6-tri(dimethylaminomethyl)phenol and triethylene tetraamine.

The mercaptan-terminated liquid acrylate polymers containing pendant hydroxyl groups can be cured to a tack-free surface at application temperatures. This combined with their low Tg value and their good weatherability and oil resistance, make these polymers useful base elastomers for sealant, caulk, and like compounds.

The following examples will further illustrate the invention. In the examples, the amounts of ingredients are expressed in parts by weight unless otherwise stated.

EXAMPLE I

Xanthate-terminated liquid acrylate polymers containing pendant epoxide groups were prepared as described below. The recipes and polymerization data were:

| Run | 1 | 2 | 3 |
|---|---|---|---|
| Ethyl acrylate | 70 | 30 | 30 |
| Normal butyl acrylate | 30 | 70 | 70 |
| Glycidyl acrylate | 5 | 3 | 5 |
| Diisopropyl xanthogen disulfide | 8 | 8 | 8 |
| Irradiation time, hours | 2.5 | 2.0 | 2.0 |
| Temperature, °C | 50 | 50 | 50 |
| Percent conversion | 91 | 81 | 68 |

The ingredients were charged to a glass reactor vessel equipped for agitation. The vessel was purged with nitrogen gas and sealed. While being agitated, the solutions were irradiated with ultra-violet light emitted from a H100A4/T Mercury lamp positioned about 2" from the vessel. The liquid polymers were recovered by heating the solutions to 90° C. under a vacuum to distill off unreacted monomers. Prior to pyrolysis, the polymers were reacted with 1,4-butanediol in the presence of concentrated HCl to form the pendant hydroxyl groups. The recipes were:

| | 1 | 2 | 3 |
|---|---|---|---|
| Grams of xanthate-terminated polymer | 310 | 720 | 610 |
| Grams, 1,4-butanediol | 11.7 | 15 | 15 |
| Grams, 38% conc. HCl | 3.1 | 3 | 3 |
| Milliliters toluene | 100 | X | X |

The xanthate-terminated liquid polymers, the 1,4-butanediol, the concentrated HCl, and the toluene if used were charged to a reactor vessel equipped for agitation. The vessel was sealed, and the solution was raised to 90° C. for one hour while being agitated. The reaction product of glycidyl acrylate with 1,4-butanediol can be called 1-hydroxyl butoxy-2-hydroxylpropyl acrylate. The excess 1,4-butanediol and the toluene was distilled off in the pyrolysis step where the solutions were raised to 200° C. for 20 minutes while under a vacuum. The mercaptan polymers were characterized as follows:

| | 1 | 2 | 3 |
|---|---|---|---|
| Bulk viscosity, cps. at 27° C. | 39,000 | 12,000 | 9,000 |
| Weight percent mercaptan | 1.93 | 2.11 | 2.43 |
| Weight percent hydroxyl | 0.99 | 1.66 | 1.72 |

The bulk viscosities were measured with a Brookfield model LVT viscometer using spindle #7 at 20 r.p.m. Mercaptan content was determined by iodine oxidation and hydroxyl content determined by caustic titration to an end point.

EXAMPLE II

The polymers prepared in Example I were cured according to the following recipes:

| | 1 | 2 | 3 |
|---|---|---|---|
| Mercaptan-terminated pendant OH polymer | 100 | 100 | 100 |
| DMP-0 [1] | 1.3 | 1.4 | 1.3 |
| Epon 828 [2] | 13.3 | 14.0 | 13.3 |
| Cure 4 days at room temperature | Dry | Dry | Dry |
| Hardness,[3] Durometer A | 27=13 | 22=14 | 23/22 |
| Percent elongation | 100 | 100 | 200 |

[1] 2,4,6-tri(dimethylaminomethyl)phenol.
[2] Diglycidol ether of Bisphenol A.
[3] Instantaneous hardness/hardness after 10 seconds.

EXAMPLE III

An xanthate-terminated liquid acrylate polymer having no pendant hydroxyl groups was prepared following the procedure of Example I. The recipe used was 30 parts of ethyl acrylate, 70 parts of normal butyl acrylate, and 6 parts of diisopropyl xanthogen disulfide. 97% conversion was obtained in four hours of irradiation. The bulk polymer had a viscosity of 17,000 cps. at 27° C. as measured by a Brookfield model LVT viscometer using spindle #7 at 20 r.p.m. The polymer was pyrolyzed by raising the temperature to 200° C. for 20 minutes while under a vacuum. The mercaptan-terminated liquid acrylate had a 23,400 cps. bulk viscosity at 27° C. and a weight percent mercaptan content of 1.52%. The polymer was then cured according to the following recipe:

| Mercaptan-terminated polymer having no hydroxyl groups | 100 |
|---|---|
| DMP-30 | 1.0 |
| Epon 828 | 16.6 |

There was no evidence of cure in one day and the polymer had a tacky surface after 7 days at room temperature.

EXAMPLE IV

A mercaptan-terminated pendant hydroxyl liquid acrylate polymer was prepared following the procedure of Example I. The polymer had a 2.11% by weight mercaptan content, a 1.66% by weight hydroxyl content, and a 12,000 cps. bulk viscosity @ 27° C. The polymer was compounded in the following sealant recipe:

| Polymer | 100 |
|---|---|
| Arochlor 1254 | 50 |
| Zinc oxide | 15 |
| RG 244 [1] | 8 |
| DMP-30 | 1.2 |
| Epon 828 | 11.5 |

[1] A fibrous asbestos filler.

The sealant had a tack-free surface after 3 days at room temperature, and a durometer hardness of 40.

The above formulations are useful as caulks for filling cracks and crevices between stone, brick, and concrete, or as a sealant for aluminum, steel, and concrete to glass junctions. Other formulations of the defined hydroxyl-containing liquid mercaptan-terminated polymer yield useful potting compounds in which electrical wires or components may be embedded to provide flexible support, or as flexible adhesives for wood to wood junctions.

I claim:

1. A liquid alkyl acrylate polymer, having a glass transition temperature of below −26° C., containing about 0.1 percent to about 10 percent by weight of pendant hydroxyl groups derived from interpolymerized units of a monomer selected from the group consisting of methylallyl alcohol, hydroxybutyl vinyl ether, orthovinyl benzyl alcohol, metavinylbenzyl alcohol, paravinyl benzyl alcohol, and the structure

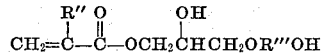

wherein R'' is hydrogen or methyl and R''' is selected from the group consisting of a radical of the formula $C_xH_{2x}$ where $x$ equals 2 to 10, an ether, a thioether and a ketone wherein the total number of carbon atoms does not exceed 10 and about 0.5 percent to about 10 percent by weight of terminal mercaptan groups, both weights based upon the total weight of polymer.

2. A liquid polymer comprising (1) about 32 percent to about 96 percent by weight of an polymerized alkyl acrylate of the formula

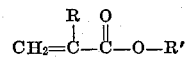

wherein R is —H, —CH$_3$, or —C$_2$H$_5$ and R' is selected from the group consisting of alkyl radicals containing 1 to 18 carbon atoms and an ether radical wherein the total number of carbon atoms does not exceed 5, (2) about 3 percent to about 60 percent by weight of the polymerized vinylidene reaction product of (a) an epoxide-containing vinylidene monomer selected from the group consisting of glycidyl acrylate, glycidyl methacrylate, glycidyl crotonate, allyl glycidyl ether, methallyl glycidyl ether, and isopropenyl glycidyl ether and (b) an alcohol selected from the group consisting of (i) R—OH wherein R is an alkyl, ether, thioether, or ketone wherein the total number of carbon atoms does not exceed 5, and (ii)

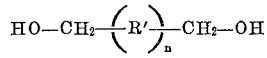

wherein R' is selected from the group consisting of a radical of the formula $C_xH_{2x}$ where $x=1$ to 10, an ether, thioether, and ketone wherein the total number of carbon atoms does not exceed 10, and $n$ is 0 to 10, and (3) from about 0.5 to about 8 percent by weight of mercaptan groups, all weights based upon the total weight of the polymer.

3. A liquid polymer of claim 1 comprising about 32 percent to about 96 percent by weight of polymerized alkyl acrylates of the formula

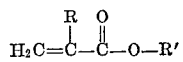

wherein R is —H, —CH$_3$, or —C$_2$H$_5$, and R' is selected from the group consisting of alkyl groups containing 1 to 18 carbon atoms and an ether group wherein the total number of carbon atoms does not exceed 5, about 3 percent to about 60 percent by weight of the polymerized structure

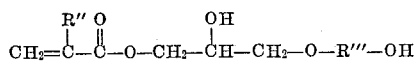

wherein R" is —H or —CH$_3$ and R''' is selected from the group consisting of a radical of the formula $C_xH_{2x}$, where $x$ is 2 to 10, an ether, a thioether, and a ketone wherein the total number of carbon atoms does not exceed 10, thereby having a hydroxyl content of from about 0.1 percent to about 10 percent by weight, and a mercaptan content of about 0.5 to about 8 percent by weight, all weights based upon the total weight of the polymer.

4. A polymer of claim 3 wherein R" is —H and R''' is $C_xH_{2x}$ where $x$ is 2 to 10.

5. A polymer of claim 4 containing about 1 percent to about 53 percent by weight of polymerized ethyl acrylate and about 14 percent to about 95 percent by weight of a polymerized alkyl acrylate of claim 4 wherein R is —H and R' is an alkyl group containing 3 to 10 carbon atoms.

6. A polymer of claim 5 wherein $x$ is 4, and the hydroxyl content is from about 0.5 percent to about 5 percent by weight.

7. A polymer of claim 1 in a cured state.

8. A process for preparing a liquid polymer having a glass transition temperature of below −26° C., a hydroxyl content of from about 0.1 to about 10% by weight and a mercaptan content of about 0.5% to about 8% by weight, all weights based upon the total weight of the polymer comprising (a) polymerizing together, in a free radical polymerization, 100 parts by weight of an acrylate of the formula

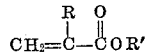

wherein R is —H, —CH$_3$ or —C$_2$H$_5$ and R' is selected from the group consisting of an alkyl radical containing 1 to 18 carbon atoms and an ether radical wherein the total number of carbon atoms does not exceed 5 and from about 2 parts to about 20 parts by weight of a vinylidene monomer containing a hydroxyl group of the formula

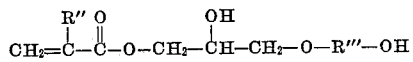

wherein R" is —H or —CH$_3$ and R''' is selected from the group consisting of a radical of the formula $C_xH_{2x}$ where $x$ is 2 to 10, an ether, thioether and a ketone radical wherein the total number of carbon atoms does not exceed 10, in the presence of about 2 to about 20 parts by weight of a dixanthogen disulfide of the formula

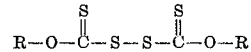

where R is an alkyl radical of 3 to 6 carbon atoms, thereby preparing a xanthate-terminated polymer, (b) heating the xanthate-terminated polymer of step (a) at a temperature from about 130° C. to about 260° C. under a vacuum, and (c) recovering the polymer.

9. A process of claim 8 wherein the acrylate monomer R is —H and R' is an alkyl group containing 3 to 8 carbon atoms, in the dixanthogen disulfide R is a diisopropyl radical, in the alcohol R' is $C_xH_{2x}$ where $x$ is 1 and $n$ is equal to 4, and the mineral acid is hydrochloric acid.

10. A process for the preparation of a liquid polymer having a glass transition temperature of below −26° C., a hydroxyl content of from about 0.1 to about 10 percent by weight, and a mercaptan content of from about 0.5 percent to about 8 percent by weight, comprising (1) polymerizing together in a free radical polymerization, 100 parts by weight of an alkyl acrylate of the formula

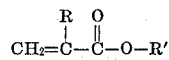

wherein R is —H, —CH$_3$, or —C$_2$H$_5$ and R' is selected from the group consisting of an alkyl radical containing 1 to 18 carbon atoms and an ether radical wherein the total number of carbon atoms does not exceed 5 and from about 2 to about 20 parts by weight of the vinylidene reaction product of (a) a vinylidene monomer containing an epoxide group selected from the group consisting of glycidyl acrylate, glycidyl methacrylate, glycidyl crotonate, allyl glycidyl ether, methallyl glycidyl ether, and isopropenyl glycidyl ether with (b) an alcohol selected from the group consisting of (i) monohydroxy alcohols of the formula R—OH wherein R is selected from the group consisting of alkyl, ether, thioether, and ketone radicals where the total number of carbon atoms does not exceed 5, and (ii) a polyhydric alcohol of the formula

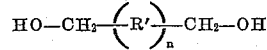

wherein R' is selected from the group consisting of a radical of the formula $C_xH_{2x}$ where $x=1$ to 10, an ether, thioether, and a ketone where the total number of carbon atoms does not exceed 10, and $n$ is 0 to 10, in the presence of from about 2 to about 20 parts by weight of a dixanthogen disulfide of the formula

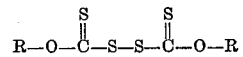

wherein R is selected from the group consisting of an alkyl group of 1 to 8 carbon atoms, an aryl, an alkaryl, and an alicyclic group, to prepare a xanthate-terminated polymer, (2) hydrolyzing the xanthate-terminated polymer in the presence of a base to obtain the mercaptan groups, and (3) recovering the polymer product.

References Cited

UNITED STATES PATENTS 3,449,301  6/1969  Noll et al. _____ 260—79
3,580,830  5/1971  Siebert _____ 204—159.24

MAURICE J. WELSH, Primary Examiner

M. I. MARQUIS, Assistant Examiner

U.S. Cl. X.R.

161—203, 204, 216, 218, 247, 256; 204—159.18, 159.24; 260—41 A, 41 B, 41 AG, 77.5 CR, 79.5 R, 79.5 C, 89.5 S, 830 S

UNITED STATES PATENT OFFICE
CERTIFICATE OF CORRECTION

Patent No. 3,711,451          Dated January 16, 1973

Inventor(s) Alan A. Csontos

It is certified that error appears in the above-identified patent and that said Letters Patent are hereby corrected as shown below:

Column 2, line 10, after "amounts" insert --of these monomers used are in the range of from about--; line 28, "polymesr" should read --polymers--; line 68, "and" first occurrence, should read --to--.

Column 3, line 3, after "onitrile," insert --methacrylonitrile--; line 16, "glycidy" should read --glycidyl--.

Column 5, lines 45 to 50, the formula should read as follows:

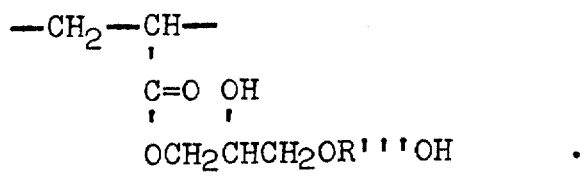

Column 7, line 59, in the table, "DMP-0$^1$" should read --DMP-30$^1$--.

Column 8, line 52, "wheerin" should read --wherein--.

Column 9, line 43, Claim 5, "14" should read --13--.

Signed and sealed this 9th day of April 1974.

(SEAL)
Attest:

EDWARD M.FLETCHER,JR.        C. MARSHALL DANN
Attesting Officer               Commissioner of Patents